United States Patent Office 3,043,539
Patented July 10, 1962

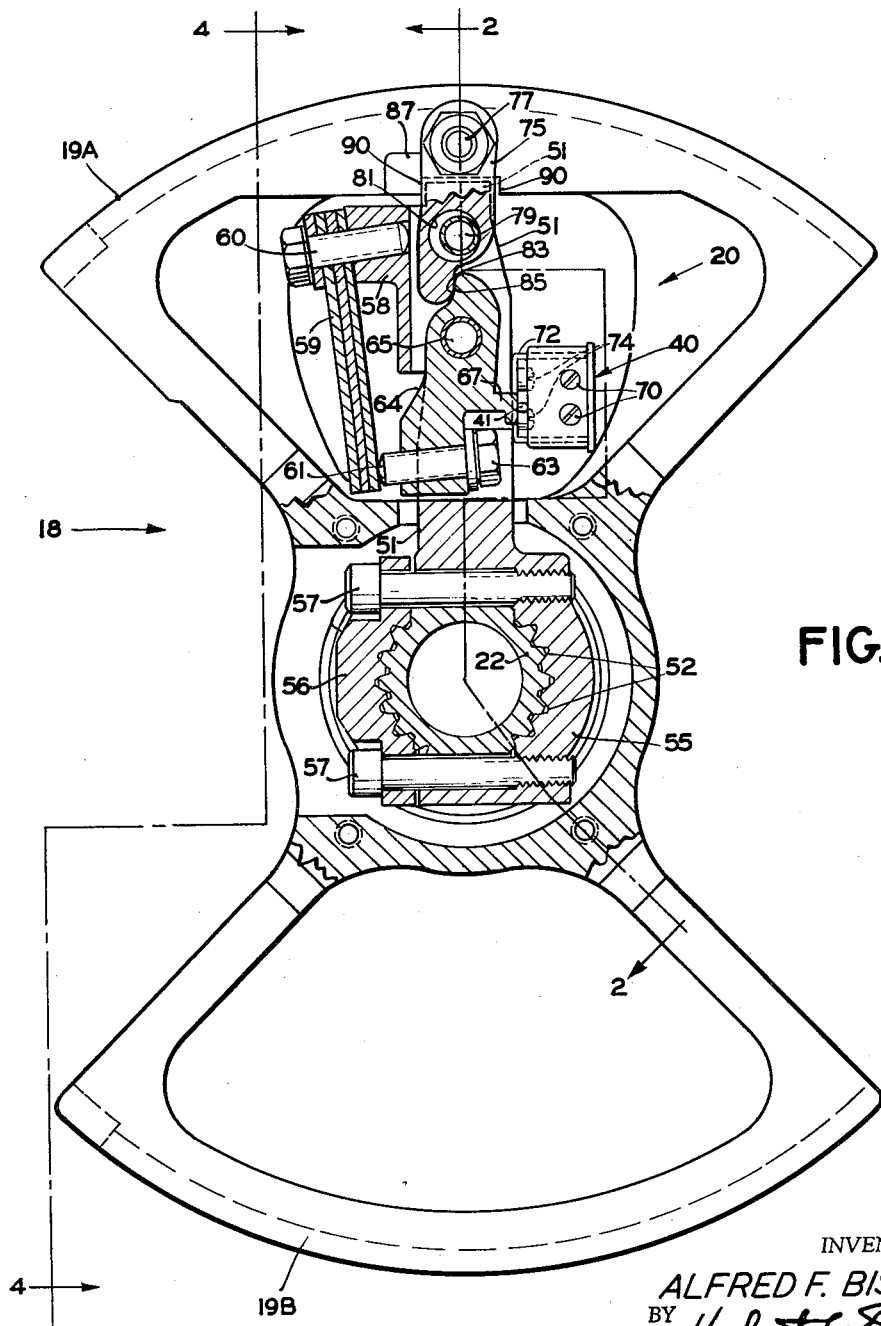

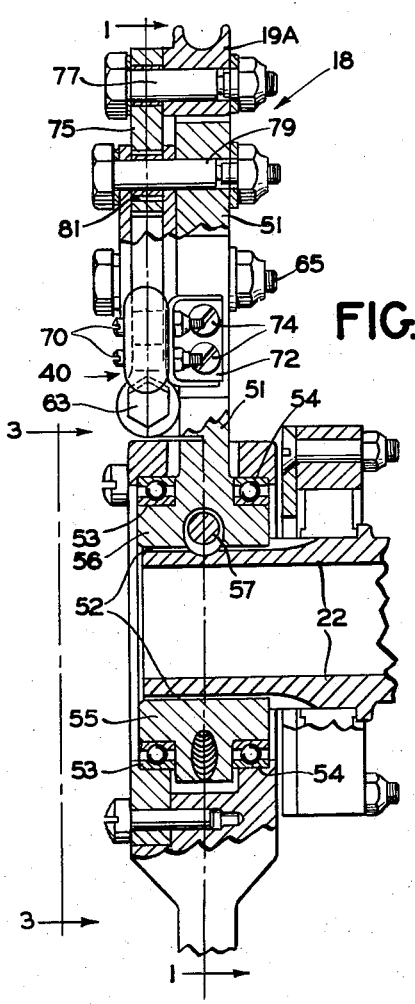
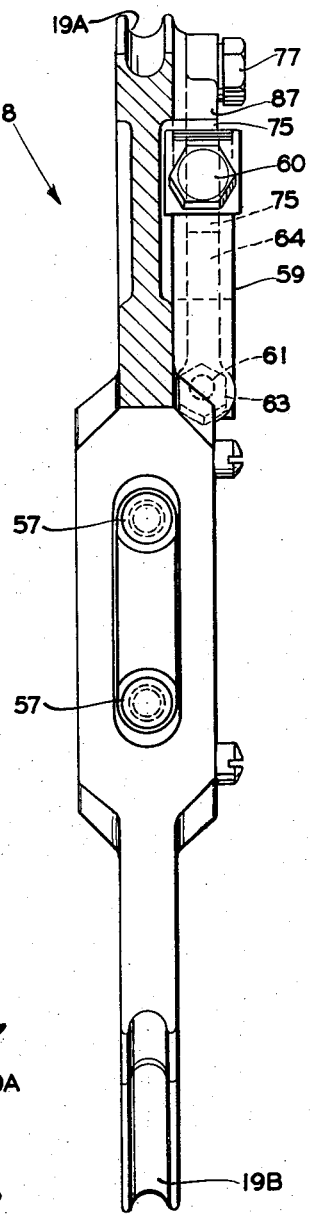
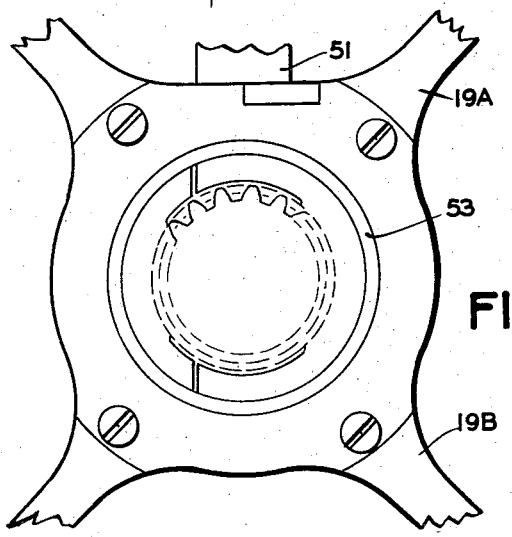

3,043,539
CONTROL STICK TORQUE SENSOR TO SELECTIVELY EFFECT AUTOPILOT AND MANUAL CONTROL OF AIRCRAFT CONTROL SURFACES
Alfred F. Bishop, Pompton Plains, N.J., assignor to The Bendix Corporation, a corporation of Delaware
Filed Jan. 8, 1960, Ser. No. 1,221
9 Claims. (Cl. 244—76)

This invention relates to improvements in a torque sensor for use with a manually operable control stick operative to selectively effect manual and automatic pilot control of aircraft control surfaces and more particularly to an improved mechanism to sense excessive torque applied at the control stick and to thereupon emit a controlling signal to disengage the automatic pilot from control of the aircraft control surfaces, while simultaneously energizing an actuator to effectively shift a ratio changer in the operating linkage from a relatively high automatic pilot operating ratio to a lower operating ratio such as to permit manual control of the aircraft control surfaces, instead of the control thereof being effected through operation of the automatic pilot.

An object of the invention is to provide an improved control stick torque sensor to provide a control signal under excessive torque conditions for disengaging the automatic pilot while rendering the control stick fully effective for manual operation in controlling the aircraft control surfaces.

Another object of the invention is to provide a novel torque sensing device and pulley assembly in which there is provided an arm splined to the pulley shaft and effective upon excessive torque being applied to the pulley shaft to cause a novel spring biased linkage assembly cooperating with the pulley arm to operate a miniature switch mounted within the pulley assembly. The operation of the miniature switch initiates an electrical signal to disengage an automatic pilot from operation of a control surface of an aircraft while simultaneously rendering the control stick effective for manual operation of the control surface.

Another object of the invention is to provide a novel arrangement in a pulley mechanism of an arm splined to the pulley shaft, together with a novel spring biased linkage assembly cooperating therewith, whereby rotation of the pulley under excessive torque in either direction may cause a miniature switch to be operated by the novel linkage assembly so as to effect the aforenoted control function with respect to the selective transfer of the operation of the aircraft control surface from the automatic pilot system to the pilot's control stick.

Another object of the invention is to provide a novel and compact control stick torque sensor mechanism including an arm splined to a pulley shaft, together with a pulley mounted on bearings on the hub of the arm, a preloaded cantilever spring, a miniature switch for applying a control signal and a lever system that applies the preload to the cantilever spring and is effective to operate the miniature switch upon an excessive load being applied to the pulley by the control stick. The operation of the miniature switch in the aforenoted mechanism resulting in the emission of an electrical signal to cause disengagement of the automatic pilot from operation of the control surface of the aircraft and render the control stick effective for the manual operation of such control surface.

Another object of the invention is to provide an improved torque sensor mechanism of the type described including a "fail safe" feature in which the arm splined to the pulley shaft is extended into a recess in the pulley with sufficient clearance so as to permit the device to function, as described, but which arrangement is such that upon failure of the mechanism the pulley engages the arm so that emergency operation of the pulley is not impaired.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:

FIGURE 1 is a side view of the torque sensor control device with a sectional view of certain of the parts thereof taken along the lines 1—1 of FIGURE 2 and looking in the direction of the arrows.

FIGURE 2 is a fragmentary sectional view taken along the lines 2—2 of FIGURE 1.

FIGURE 3 is a fragmentary end view of FIGURE 2 taken at 3—3 and looking in the direction of the arrows.

FIGURE 4 is a sectional view of FIGURE 1 taken along the lines 4—4.

Figure 5:
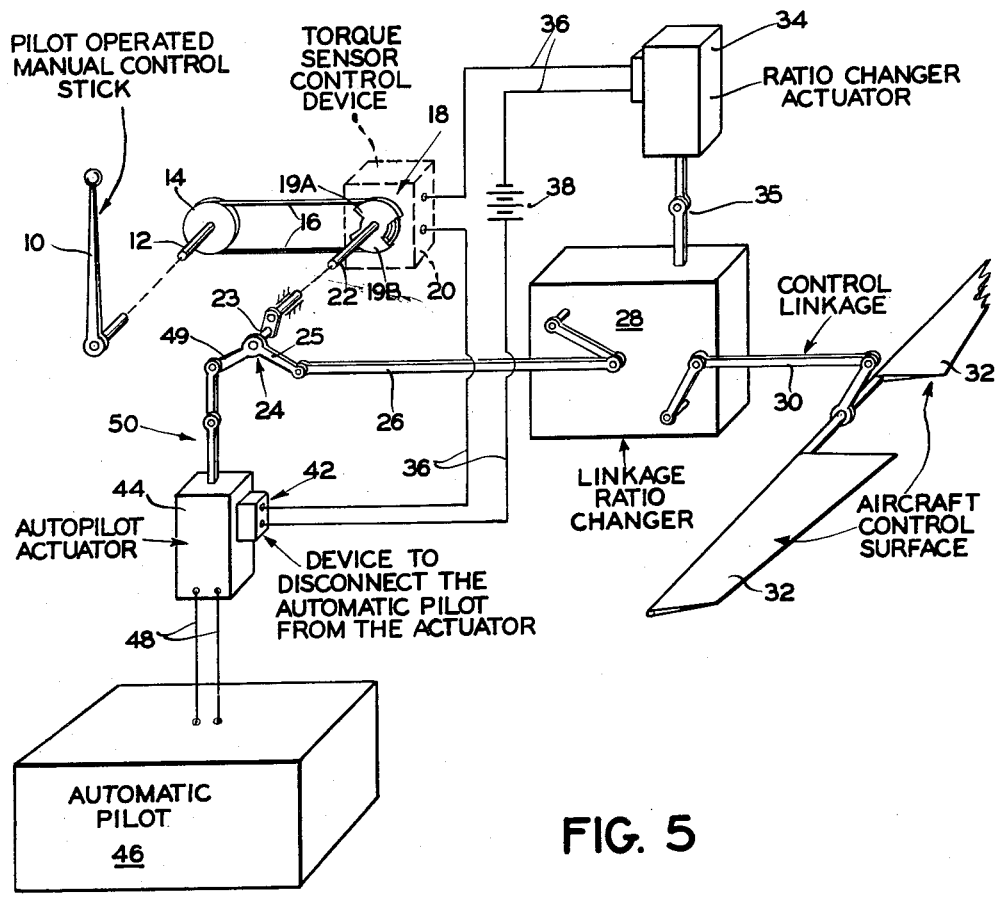
FIGURE 5 is a diagrammatic showing of a typical system in which the torque sensor control device is designed for use.

Referring to the drawing of FIGURE 5, there is indicated by the numeral 10 a control stick operable by a pilot of an aircraft and connected through a shaft 12, pulley 14 and pulley lines 16 to a second pulley 18 having segment portions 19A and 19B and a torque sensor control device 20, as shown in FIGURE 1, and explained hereinafter in greater detail.

The pulley 18 is in turn connected through a pulley shaft 22 to an arm 23 on which is pivotally mounted a bellcrank lever 24 having an arm 25 operably connected through a link 26 to a linkage ratio changer 28. The ratio changer 28 may be of a conventional type or of a type such as disclosed and claimed in copending U.S. application Serial No. 504,270, now U.S. Patent No. 2,940,-332 granted June 14, 1960, and U.S. application Serial No. 504,284, now U.S. Patent No. 2,940,696 granted June 14, 1960, and both filed April 27, 1955, by Walter D. Teague, Jr., and assigned to Bendix Aviation Corporation.

Such linkage ratio changer 28 may have an output control linkage 30 operatively connected to control the position of aircraft control surfaces 32 and may include a ratio changer actuator 34 operatively connected to ratio changer 28 by linkage 35 and which upon energization may vary the ratio of surface movement to controller movement from a relatively high ratio to a relatively low ratio of, for example, a 1:1 ratio, as explained in the aforenoted copending applications.

The actuator 34 may be of an electrically energized type of motor or solenoid actuator, the energization of which may be effected through lines 36 connected to a source of electrical energy or battery 38 through a selectively operated miniature switch mechanism 40 of conventional type mounted within the torque sensor control device, as best shown in FIGURES 1 and 2, and having, as shown in FIGURE 1, an operating button 41 biased in a sense for closing the switch 40 by a spring of conventional type not shown.

The lines 36 may also effect upon closure of the switch 40 energization of a relay mechanism 42 of conventional type and operative to disengage or render ineffective an autopilot actuator motor 44 the operation of which is normally controlled by an autopilot 46 through the control lines 48. The actuator 44 is operatively connected to an arm 49 of the bell-crank lever 24 through linkage 50 and is arranged to control through the bell-crank lever 24 and linkage 26, 28 and 30 the position of the aircraft control surfaces 32 during normal automatic pilot flight operation.

However, upon the pilot wishing to take over manual control of the aircraft control surfaces 32, a force may be applied to control stick 10 in opposition to the controlling force of the autopilot actuator 44 and tending to position the bell-crank lever 24, whereupon the torque sensed by the device 20 exceeds a predetermined value effecting closure of the miniature switch 40, as will be hereinafter explained, so as to effect through conductors 36 energization of the ratio changer actuator 34 to shift the ratio changer 28 to a low ratio position while effecting through the device 42 disengagement of the autopilot 46 so as to permit direct manual control of the position of the aircraft control surfaces by further manual operation of the control stick 10.

*Torque Sensor Control Device*

The torque sensor control device 20, forming the subject matter of the present invention, is shown in FIGURES 1 to 4 and includes, as best shown in FIGURE 1, an arm 51 splined to pulley shaft 22 at 52 and has the pulley 18 mounted on bearing 53 and 54 surrounding hub portions 55 and 56 of the arm 51, as best shown in FIGURE 2. The hub portions 55 and 56 are secured about the shaft 22 by bolts 57, as shown in FIGURE 1.

Further fastened to a flange portion 58 projecting from the arm 51 is a preloaded cantilever spring 59. The cantilever spring 59 is fastened at one end by a bolt 60 to the flange portion 58, while the opposite end of the spring 59 bears upon an end 61 of an adjusting screw 63 which is screw threadedly engaged in a portion of a lever 64. The lever 64 is in turn pivotally connected to arm 51 through a pin 65. A portion 67 of the lever 64 is arranged to operatively actuate the control button 41 of the miniature switch 40. The switch 40 is fastened by bolts 70 to a flange 72 which is in turn fastened to the arm 51 by a second pair of bolts 74.

There is further arranged in cooperative relation with the lever 64, a second lever 75 pivotally connected to one segment 19A of the pulley 18 through a pin 77, as shown in FIGURES 1 and 2. The lever 75 is further operatively connected to arm 51 through a pin 79 which floats in an oversize hole 81 in the lever 75, as shown in FIGURE 1, while an end portion 83 of the lever 75 engages an end portion 85 of the lever 64 so as to apply through the adjustment screw 63 a preload to the cantilever spring 59 so that during normal operation the arm 51 and shaft 22 are driven from the pulley 18 and through the levers 75 and 64 and the cantilever spring 59 in unison with the pulley 18.

A stop member 87 formed integral with the segment portion 19A of the pulley 18 is arranged to engage the lever 75 upon movement of the pulley 18 in a clockwise direction so as to apply through the levers 75 and 64 a preload to cantilever spring 59. Such lever system in conjunction with the stop 87 and preloaded cantilever spring 59 enables the entire assembly including shaft 22 and arm 51 to move as a unit with the pulley 18 under normal operating conditions.

Thus, the lever system, including the lever 75 operatively connected to pulley 18 through pin 77 and to lever 64 through end portions 83 and 85, applies through the adjusting screw 63 a preload to the cantilever spring 59 carried by the flange portion 58 of the lever 51 splined to pulley shaft 22, so as to cause the shaft 22 to move with the pulley 18 in the aforenoted operation under normal operating conditions, as upon the force applied to the pulley 18 being in a clockwise or counterclockwise direction and the torque sensed by the torque sensor 20 not being in excess of a predetermined value.

However, upon the pulley 18 being rotated in a clockwise direction and an excessive torque or a torque in excess of a predetermined value being applied to shaft 22, the pin 77 and stop 87 tend to rotate lever 75 about the center of shaft 22, while the arm 51, due to the excessive torque applied to shaft 22 tends to lag behind the clockwise movement of the pulley 18 so that the pin 79 carried by arm 51 and floating in the oversize hole 81 in the lever 75 permits movement of lever 75 relative to arm 51 and does not interfere with the resulting pivotal movement of lever 64 in opposition to spring 59 and about the pin 65 carried by arm 51.

Further, the lever 75 through its contact at the portion 83 thereof with the portion 85 of lever 64 tends in such movement about the center of shaft 22 to also pivot lever 64 about pin 65 in a clockwise direction and in opposition to the cantilever spring 59 so as to cause the portion 67 of the lever 64 to actuate the button 41 of the miniature switch 40 and thereby close the energizing circuit 36 for the device 42 and actuator 34. The energization of the device 42 and actuator 34 serves to disengage the autopilot 46 and effectively connect the control lever 10 through the linkage ratio changer 28 to the aircraft control surfaces 32, as heretofore described with reference to the diagrammatic showing of FIGURE 5.

Similarly, upon the pulley 18 being rotated in a counterclockwise direction and an excessive torque being applied to the shaft 22, the arm 51 due to the excessive torque applied to shaft 22 tends to lag behind the counterclockwise movement of the pulley 18 so that the lever 75 engaged in the hole 81 by the pin 79 carried by arm 51 tends to rotate on pin 77 in a counterclockwise direction. This causes the lever 75 to actuate the lever 64 through engaging portions 83 and 85 and to thereby pivot the lever 64 about pin 65 in a clockwise direction and in opposition to the cantilever spring 59 so as to again cause the portion 67 of the lever 64 to actuate the control button 41 to close the miniature switch 40. This in turn causes energization of the circuit 36 together with device 42 and actuator 34 to effect disengagement of the autopilot 46 and operative engagement of the manual control stick 10 with the aircraft surfaces 32, as heretofore described.

There is further provided in the torque sensor device 20 a "fail safe" feature in that the arm 51 is extended into a recess 90 provided in pulley segment 19A and with sufficient clearance so as to permit the torque sensor control device 20 to function, as heretofore described, but so arranged that in the event of a failure in the mechanism, the pulley will still engage the arm 51 at the recessed portion 90 so that effective operation of the pulley 18 and actuation of the arm 51 and the pulley shaft 22 splined thereto at 52 will not be impaired.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. Torque sensing means comprising a pulley, a shaft for the pulley, an arm connected to the shaft, control means carried by the arm, lever means pivotally connected to said arm and pulley, a resilient linkage carried by said arm and operatively connected to said pivotal lever means to bias said pivotal lever means relative to said arm and pulley and into cooperative driving relation between said arm and pulley, said resilient linkage and pivotal lever means being drivingly connected in series between the arm and the pulley, means operatively connecting the pivotal lever means to the control means carried by said arm, and said pivotal lever means being effective to operate the control means through said operative connecting means upon an excessive toruqe being applied from the pulley to the shaft.

2. Torque sensing means comprising a pulley, a shaft for the pulley, an arm connected to the shaft, an electric control means carried by the arm, means for operatively connecting the pulley to the arm including a pair of cooperating lever members, one of said levers members being pivotally connected at one end to the pulley, the other of said lever members being pivotally connected to said arm, and spring means operatively connected between the arm and one end of said other lever member, means for operatively connecting the other lever member to the control means, and said connecting means being effective to operate said control means in a controlling sense in opposition to said spring means acting on said one end of said other lever member upon a torque being applied from the pulley to the shaft in excess of a predetermined value.

3. Torque sensing means comprising a pulley, a shaft for the pulley, an arm connected to the shaft, an electric control switch carried by the arm, means for operatively connecting the pulley to the arm including a pair of cooperating lever members, a first pin to pivotally mount one of said lever members on said pulley, a first stop on the pulley for limiting in one sense pivotal movement of said one member on said first pin and relative to said pulley, a second stop on said arm for limiting in an opposite sense pivotal movement of said one member on said first pin and relative to said arm, a second pin to pivotally mount the other of said lever members on said arm, a cantilever spring operatively connected between said arm and one end of said other lever member for biasing the other lever member into operative engagement at an opposite end thereof with said one lever member, said other lever member having a portion thereof intermediate the ends thereof for operating said control switch, and said operating portion of said other lever member being effective to actuate said control switch in a controlling sense in opposition to the biasing force of said cantilever spring upon a torque being applied from the pulley to the shaft in excess of a predetermined value.

4. Torque sensing means comprising a pulley, a shaft for the pulley, an arm connected to the shaft, an electric control switch carried by the arm, means for operatively connecting the pulley to the arm including a pair of cooperating lever members, a first pin to pivotally mount one of said lever members on said pulley, a first stop on the pulley for limiting in one sense pivotal movement of said one member on said first pin and relative to said pulley, a second stop on said arm for limiting in an opposite sense pivotal movement of said one member on said first pin and relative to said arm, a second pin to pivotally mount the other of said lever members on said arm, a cantilever spring operatively connected between said arm and one end of said other lever member for biasing the other lever member into operative engagement at an opposite end thereof with said one lever member, said other lever member having a portion thereof intermediate the ends thereof for operating said control switch, said operating thereof for operating said control switch, said operating portion of said other lever member being effective to actuate said control switch in a controlling sense in opposition to the biasing force of said cantilever spring upon a torque being applied from the pulley to the shaft in excess of a predetermined value, said pulley having an internal notch provided therein, and said arm having a free end movably mounted in said notch and arranged so as to engage in said notch for directly connecting the pulley and the shaft upon the first mentioned connecting means failing to drivingly connect the pulley and arm.

5. For use in an aircraft having a control surface, a manually operable control member, an automatic pilot, variable ratio linkage means for operatively connecting the control member and automatic pilot to the control surface, a device to disconnect the automatic pilot from the linkage means, and said variable ratio linkage means including actuator means operable to vary the ratio of the linkage means; torque sensing means comprising a pulley operatively connected to the control member, a shaft for the pulley operatively connected through the variable ratio linkage means to the control surface, an arm connected to the shaft, means to control the aforesaid device and actuator, said control means being carried by said arm, a resilient linkage assembly drivingly connected between the arm and the pulley, means operatively connecting the resilient linkage assembly to the control means, and said connecting means being effective to actuate the control means upon an excessive torque being applied by the manually operable control member to the shaft through the pulley so as to cause said control means to render said device effective to disconnect the automatic pilot from the linkage means and said actuator effective to vary the ratio of the variable ratio linkage means so as to permit said manually operable control member to operate the control surface through the linkage means.

6. For use in an aircraft having a control surface, a manually operable control member, an automatic pilot, variable ratio linkage means for operatively connecting the control member and automatic pilot to the control surface, a device to disconnect the automatic pilot from the linkage means, and said variable ratio linkage means including actuator means operable to vary the ratio of the linkage means; torque sensing means comprising a pulley operatively connected to the control member, a shaft for the pulley operatively connected through the variable ratio linkage means to the control surface, an arm connected to the shaft, means to control the aforesaid device and actuator, said control means being carried by said arm, a resilient linkage assembly drivingly connected between the arm and the pulley, means operatively connecting the resilient linkage assembly to the control means, said connecting means being effective to actuate the control means upon an excessive torque being applied by the manually operable control member to the shaft through the pulley so as to cause said control means to render said device effective to disconnect the automatic pilot from the linkage means and said actuator effective to vary the ratio of the variable ratio linkage means so as to permit said manually operable control member to operate the control surface through the linkage means, said pulley having an internal recess provided therein, and said arm having a free end movably mounted in said recess relative to said pulley so as to engage in said recess for directly connecting the pulley and thereby the manually operable control member to the shaft for positioning the control surface upon the excessive torque being so great as to prevent the resilient linkage assembly from drivingly connecting the arm and pulley.

7. Torque sensing means comprising a rotatable member, a shaft for supporting the rotatable member, an arm operatively connected to the shaft, control means carried by the arm, lever means pivotally connected to said arm and rotatable member, a resilient linkage carried by said arm and operatively connected to said pivotal lever means to bias said pivotal lever means relative to said arm and rotatable member and into cooperative driving relation between said arm and rotatable member, said resilient linkage and pivotal lever means being serially connected so as to drivingly connect the arm and the rotatable member, means to operatively connect the pivotal lever means to the control means carried by the arm, and said pivotal lever means being so arranged as to effectively operate the control means through said operative connecting means upon an excessive torque being applied from the rotatable member and through the resilient linkage and pivotal lever means to the arm operatively connected to the shaft.

8. For use in an aircraft having a control surface, an operator-operative control element, an automatic pilot, variable ratio linkage means for operatively connecting the control element and automatic pilot to the control surface, a device to operatively disconnect the automatic pilot from the linkage means, and said variable ratio linkage means including actuator means operable to vary the ratio of the linkage means; torque sensing means comprising a rotatable member, a shaft member for supporting the rotatable member, one of said members being operatively connected to said control element and the other of said members being operatively connected through the variable ratio linkage means to the control surface, an arm operatively connected to the shaft, means to operatively control the aforesaid device and actuator, said control means being carried by said arm, a resilient linkage to drivingly connect the arm and the rotatable member, means to operatively connect the resilient linkage to the control means, said connecting means being so arranged as to effectively operate the control means upon an excessive torque being applied through the resilient linkage, whereupon the control means renders said disconnect device effective to operatively disconnect the automatic pilot from the variable ratio linkage means and said actuator effective to vary the ratio of the variable ratio linkage means so as to render said operator-operative control element effective to operate the control surface through said linkage means.

9. The combination defined by claim 8 in which said rotatable member has a recess provided therein, and said arm has a free end movably mounted in said recess so as to operatively engage said member for directly connecting the rotatable member to the shaft through the arm for positioning the control surface upon the excessive torque being so great as to prevent the resilient linkage from drivingly connecting the arm and rotatable member.

References Cited in the file of this patent

UNITED STATES PATENTS

| | | |
|---|---|---|
| 2,363,611 | Newell | Nov. 28, 1944 |
| 2,508,883 | Knowler et al. | May 23, 1950 |
| 2,689,891 | Silver et al. | Sept. 21, 1954 |

FOREIGN PATENTS

| | | |
|---|---|---|
| 803,576 | Great Britain | Oct. 29, 1958 |